(12) United States Patent
Kobayashi

(10) Patent No.: US 6,552,848 B2
(45) Date of Patent: Apr. 22, 2003

(54) REAR PROJECTION TYPE SCREEN AND METHOD OF MANUFACTURING SAME

(75) Inventor: Hideki Kobayashi, Niigata (JP)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 09/950,647

(22) Filed: Sep. 13, 2001

(65) Prior Publication Data

US 2002/0048082 A1 Apr. 25, 2002

(30) Foreign Application Priority Data

Sep. 14, 2000 (JP) ........................... 2000-280768

(51) Int. Cl.$^7$ ................. G03B 21/60; G03B 21/56; G02B 17/00
(52) U.S. Cl. ................. 359/457; 359/459; 359/460; 359/621
(58) Field of Search ................. 359/443, 454, 359/455, 456, 457, 459, 460, 621

(56) References Cited

U.S. PATENT DOCUMENTS

| | | | | |
|---|---|---|---|---|
| 5,513,037 A | * | 4/1996 | Yoshida et al. | 359/457 |
| 5,751,478 A | * | 5/1998 | Yoshimura et al. | 359/453 |
| 6,292,295 B1 | | 9/2001 | Yamashita et al. | 359/460 |
| 6,304,379 B1 | | 10/2001 | Kobayashi | 359/457 |

FOREIGN PATENT DOCUMENTS

| | | |
|---|---|---|
| EP | 0940712 | 9/1999 |
| JP | 62-236282 | 10/1987 |

* cited by examiner

Primary Examiner—Christopher Mahoney
Assistant Examiner—Magda Cruz
(74) Attorney, Agent, or Firm—Oblon, Spivak, McClelland, Maier & Neustadt, P.C.

(57) ABSTRACT

A rear projection type screen is provided with a Fresnel lens and a lenticular lens, for use with a light valve having pixels. The rear projection type screen has such lens pitches that the secondary moiré pitch PMM indicated by the following equation is 3 mm or less, taking the lens pitch of the Fresnel lens as PF (mm), the lens pitch of the lenticular lens as PL (mm), and the pitch of the pixels in the light valve as PS (mm).

$$PMM = \frac{1}{\left|\frac{1}{PM} - \frac{1}{PS}\right|} \qquad PM = \frac{1}{\left|\frac{i}{PF} - \frac{j}{PL}\right|}$$

According to the present invention, it is possible to provide a rear projection type screen which reduce the occurrence of moiré patterns.

8 Claims, 5 Drawing Sheets

REAR PROJECTION TYPE SCREEN AND METHOD OF MANUFACTURING SAME

BACKGROUND OF THE INVENTION

1. Field of the Invention

The present invention relates to a rear projection type screen for projecting images from a rear face, and more particularly to a rear projection type screen provided with a Fresnel lens and a lenticular lens.

2. Description of the Related Art

Firstly, an outline of a rear projection type television (hereinafter, called "RPTV") using a rear projection type screen is described. FIG. 1 shows a schematic view of a conventional RPTV. As shown in FIG. 1, the liquid-crystal type RPTV comprises, at the least, a liquid crystal projector 1, and a rear projector type screen 2. This rear projection type screen 2 generally comprises a Fresnel lens sheet 21 and a lenticular lens sheet 22. The Fresnel lens sheet 21 has a function of containing the image light from the liquid crystal projector 1 within a prescribed angular range. In this example, a Fresnel lens 21a is provided on the surface of the Fresnel sheet 21 at which the image light is emitted. Furthermore, the lenticular lens sheet 22 has the function of broadening the image light that has passed through the Fresnel lens sheet 21, to a suitable angular range. In this example, a lenticular lens 22a is provided on the surface of the lenticular lens sheet 22 where the image light is incident thereon.

The base material of the Fresnel lens sheet 21 is, for example, made from an acrylic resin, such as polymethyl methacrylate (PMMA), or a copolymer of PMMA with ethyl acrylate, styrene, or methylacrylate, a vinyl chloride resin, polycarbonate, polystyrene, or a high-impact acrylic resin material constituting a rubber component polymerised with or dispersed in acrylic. The lens pattern of the Fresnel lens 22a is, for example, constituted by an ultraviolet rays curing acrylate resin. The lenticular lens sheet 22 is, for example, made from an acrylic resin, such as PMMA, or a copolymer of PMMA with ethyl acrylate or methylacrylate, a vinyl chloride resin, polycarbonate, polystyrene, or a high-impact acrylic resin material constituting a rubber component polymerised with or dispersed in acrylic.

In FIG. 1, the length indicated by PF is the lens pitch of the Fresnel lens 22a, and the length indicated by PL is the lens pitch of the lenticular lens 22a. Furthermore, PS is the pitch of the pixels projected onto the screen 2 by the liquid-crystal projector 1, and here, this equals the pitch of the pixels on the output face of the lenticular sheet 22a.

FIG. 2 shows an approximate view of a rear projection type screen. This rear projection type screen 2 comprises a Fresnel lens sheet 21 and a lenticular lens sheet 22, as stated previously, the Fresnel lens 22a and lenticular lens 22a being disposed in a mutually facing arrangement. In the diagram, the output face of the lenticular lens sheet 22 is planar, but it is also possible to provide an external light absorbing layer in the non-collecting portion which does not collect light from the lenticular lens 22a.

FIG. 3 is a schematic diagram of a Fresnel lens sheet 21 used in a rear projection type screen. As shown in this diagram, there exist optical transmission regions and non-transmission regions in the Fresnel lens sheet 21. Furthermore, FIG. 4 is a schematic diagram of a lenticular lens sheet 22 used in a rear projection type screen. As shown in the diagram, there exist optical transmission regions and non-transmission regions. The optical transmission regions are bright and the optical non-transmission regions are dark. It is also known that the optical transmission regions and non-transmission regions of this kind cause characteristic patterns called "moiré" patterns to be produced on both lens sheets. Meanwhile, periodic non-transmission regions occur when an image is produced by a light bulb which have many pixels, such as an LCD.

In the prior art, it is known that the moiré pattern generated between a Fresnel lens 22a and a lenticular lens 22a can be reduced by suitable adjustment of the PL/PF ratio relating to the respective lens pitches PL, PF (Japanese Patent Application: Laid-open No. S59-95525, Japanese Patent Application Laid-open No. S60-263932, Japanese Patent Application Laid-open No. H3-149540). Furthermore, in the case of an image produced by a light bulb which have many pixels, such as an LCD, or the like, in order to reduce the moiré pattern generated between the pixels and the lenticular lens 22a, suitable adjustment of the pitch ratio PS/PL, with respect to the pixel pitch and the lenticular lens 22a pitch, is made similarly(Japanese Patent Application Laid-open No. H3-168630, Japanese-Patent Application Laid-open No. S62-236282, Japanese Patent Application Laid-open No. H2-97991). Japanese Patent Application Laid-open No. H2-97991 also discloses adjustment of the pitch ratio between the screen pitch in the cyclical direction, and the pitch of the pixels, but since the cyclical pitch of the screen is identified as the pitch of the lenticular lens, it does not disclose the idea of the present invention. However, if an image projected by a light bulb having pixels is viewed after passing through a lenticular lens and Fresnel lens, then even if the lenticular lens pitch and the Fresnel lens pitch are adjusted, and the lenticular lens pitch and pixel pitch are adjusted, by using the conventional method, there still remains a problem in that a moiré pattern occurs.

SUMMARY OF THE INVENTION

In view of the foregoing, it is an object of the present invention to provide a rear projection type screen which reduce the occurrence of moiré patterns.

It is another object of the present invention to provide a method for manufacturing a rear projection type screen which reduce the occurrence of moiré patterns.

According to one aspect of the present invention, for achieving the above-mentioned object, there is provided a rear projection type screen comprising a Fresnel lens and a lenticular lens, for use with a light valve having pixels, wherein the rear projection type screen has such lens pitches that the secondary moiré pitch PMM indicated by the following equation is 3 mm or less, taking the lens pitch of the Fresnel lens as PF (mm), the lens pitch of the lenticular lens as PL (mm), and the pitch of the pixels in the light valve as PS (mm).

$$PMM = \frac{1}{\left|\frac{1}{PM} - \frac{1}{PS}\right|} \qquad PM = \frac{1}{\left|\frac{i}{PF} - \frac{j}{PL}\right|}$$

(where i and j are natural numbers)

According to another aspect of the present invention, there is provided a method of manufacturing a rear projection type screen comprising a Fresnel lens and a lenticular lens, for use with a light valve having pixels, comprising: a first step of calculating the moiré pitch of the moiré pattern generated by the Fresnel lens and the lenticular lens, on the basis of the lens pitch of said Fresnel lens and the lens pitch of the lenticular lens; a second step of calculating a further moiré pitch on the basis of the moiré pitch calculated in the first step and the pitch of the pixels in the light valve; a third step of setting the respective lens pitches in such a manner that the value of the moiré pitch calculated at the second step is equal to or less than a prescribed value; and a fourth step of manufacturing the Fresnel lens and the lenticular lens on the basis of the lens pitch values set in the third step.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DESCRIPTION OF THE PREFERRED EMBODIMENTS

Figure 1:
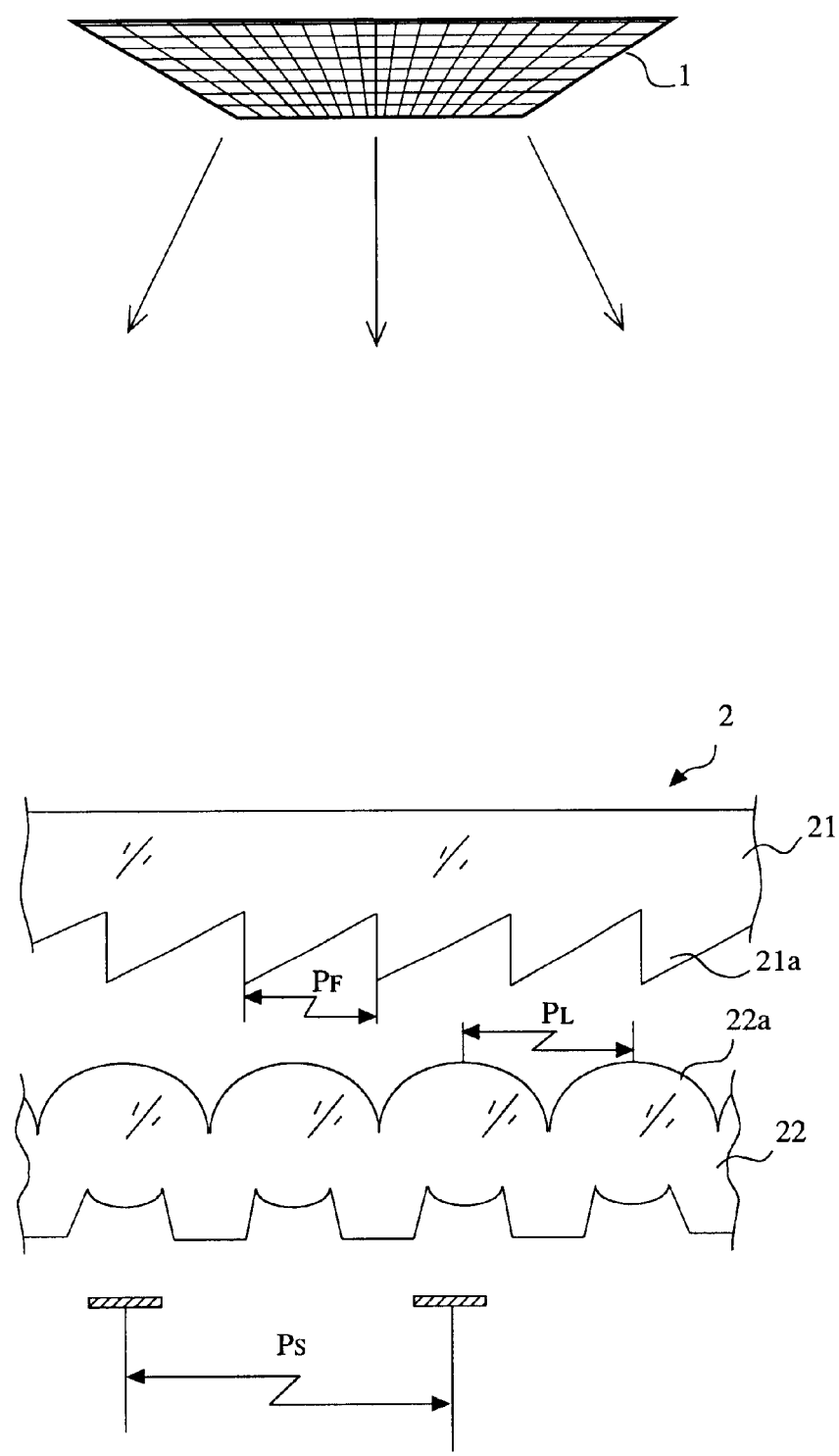
FIG. 1 shows a schematic view of a conventional RPTV.
Figure 2:
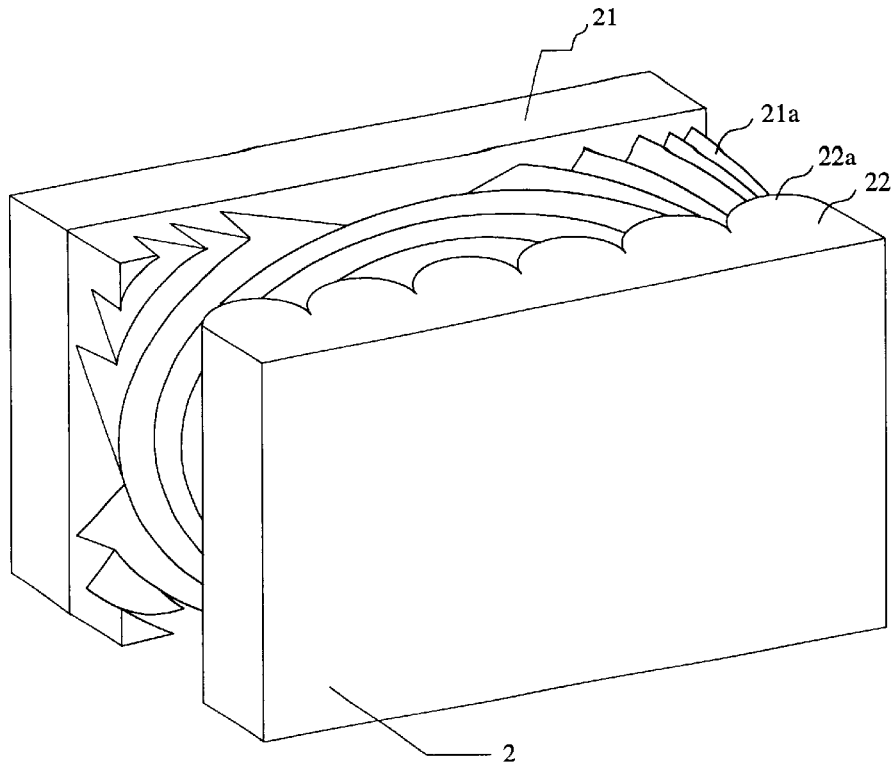
FIG. 2 shows an approximate view of a rear projection type screen.
Figure 3:
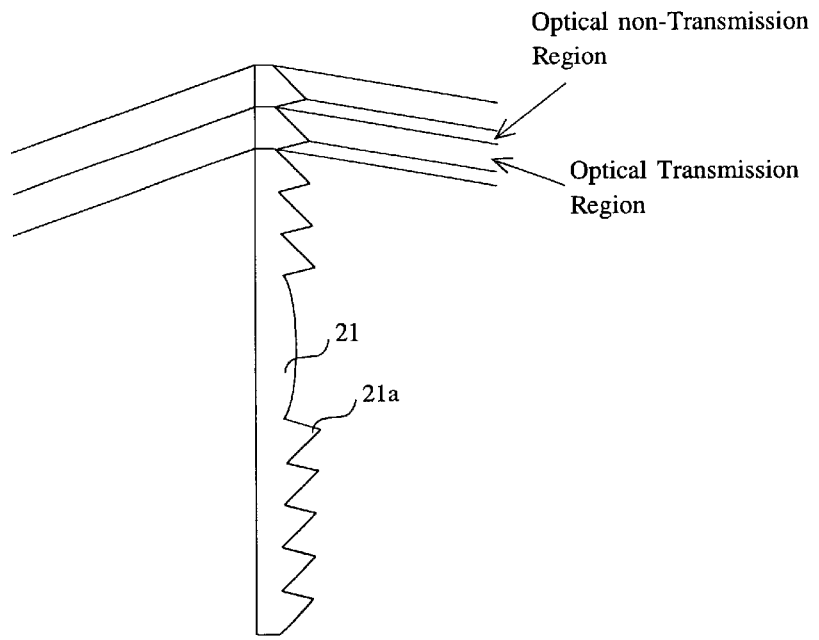
FIG. 3 is a schematic diagram of a Fresnel lens sheet used in a rear projection type screen.
Figure 4:
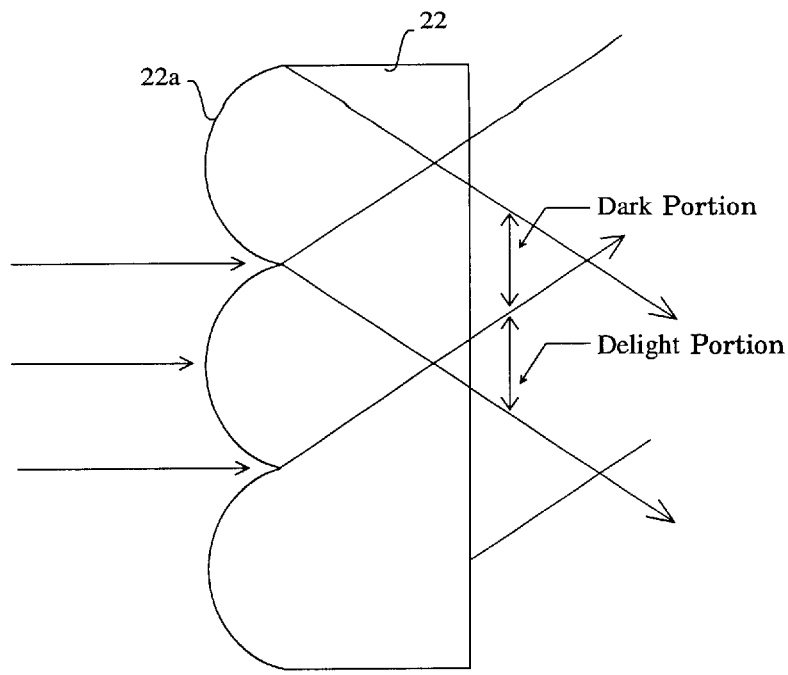
FIG. 4 is a schematic diagram of a lenticular lens sheet used in a rear projection type screen.

Conventionally known situations relating to moiré patterns concern generation of moiré patterns between two respective elements, namely, between a lenticular lens 22a and Fresnel lens 22a, or between a lenticular lens 22a and pixels, as described above, but there has been no understanding of the principles of, or possible solutions for, moiré patterns generated by three elements, namely, the lenticular lens 22a, the Fresnel lens 22a and the pixels. The finding of the present invention is that the moiré pattern generated between two elements itself creates a further moiré pattern by interaction with another element having optical non-transmission regions, and that it is also possible to reduce this newly created moiré pattern.

The moiré pitch PM (mm) generated between the lenticular lens 22a and the Fresnel lens 22a can be expressed as the following equation (2), in terms of the pitch PL (mm) of the lenticular lens 22a, and the pitch PF (mm) of the Fresnel lens 21a.

$$PM = \frac{1}{\left|\frac{i}{PF} - \frac{j}{PL}\right|} \quad (2)$$

Here, i and j are natural numbers below 5.

Furthermore, the pitch PMM (mm) of the secondary moiré pattern generated by the three elements, namely, the pixels, lenticular lens 22a and Fresnel lens 22a, can be expressed by the following equation (1), taking the pixel pitch as PS (mm).

$$PMM = \frac{1}{\left|\frac{1}{PM} - \frac{1}{PS}\right|} \quad (1)$$

It is understood that the moiré pitch PMM should be 3 (mm) or less. This embodiment of the present invention is now described in further detail. For example, the moiré PM generated between a Fresnel lens 22a and a lenticular lens 22a is expressed by equation (2) above. Here, if i=1, indicating the fundamental wave of the spatial frequency of the lens pitch of the Fresnel lens 22a, then the moiré pitch PM will be a maximum when PL=jPF. In other words, a notable moiré pattern will be generated when the lens pitch of the lenticular lens 22a is an integral factor the lens pitch of the Fresnel lens 22a.

Considering, now, a case where i=2, which indicates the second harmonic wave of the spatial frequency of the lens pitch of the Fresnel lens 22a, the moiré pitch PM will be a maximum when PL=0.5×jPF. In other words, a notable moiré pattern will be generated when the lens pitch of the lenticular lens 22a is an integral factor of ½ the lens pitch of the Fresnel lens 22a. Similarly, n=3 indicates a third harmonic wave, and n=4 indicates a fourth harmonic wave. In these cases, a notable moiré pattern is generated, when the lens pitch of the lenticular lens 22a is an integral factor of ⅓ and ¼ of the lens pitch of the Fresnel lens 22a, respectively. This applies similarly to the case of a fifth harmonic wave.

Here, equation (2) presented above is rewritten as the following equation (3), in order to standardize by the pitch PL of the lenticular lens.

$$\frac{1}{PM/PL} = \left|\frac{i}{PF/PL} - j\right| \quad (3)$$

Figure 5:
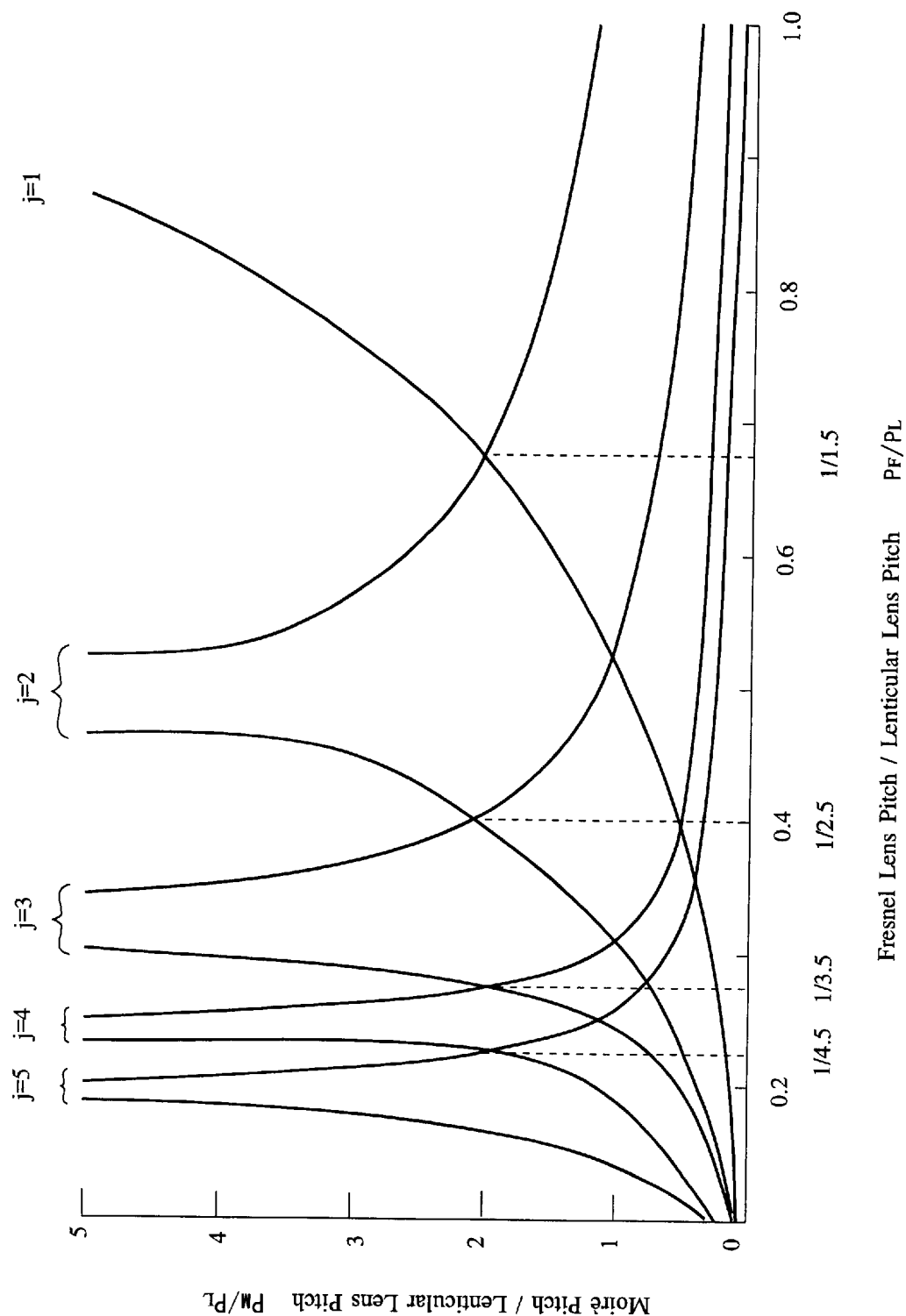
FIG. 5 shows a relationships between PF/PL and PM/PL when i=1 in equation (3).

FIG. 5 shows the relationships between PF/PL and PM/PL when i=1 in equation (3). This diagram shows these relationships for cases where j=1, 2, 3, 4, 5, in particular.

In general, when used as a rear projection type screen, the aforementioned combinations which generate notable moiré patterns are avoided, and combinations which do not yield mutual integral factors are selected. However, even in such cases, the moiré patterns are not completely eradicated, and a moiré pattern with the pitch indicated in equation (2) is generated. Normally, this moiré pattern has a small pitch, or is not readily noticeable due to the optical dispersion effect of the screen.

In a situation of this kind, if an element having a third optical non-transmission region is present, then the relatively unnoticeable moiré pattern is sampled by the third optical non-transmission region, thereby generating a moiré pattern which is detrimental to the image. This becomes a particular problem in cases where the pixel pitch is of the order of 1 (mm). For example, if the pitch of the lenticular lens 22a is 0.3 (mm), and the pitch of the Fresnel lens 22a is 0.111 (mm), then from equation (2), the moiré pattern arising between the two lenses when j=3 and i=1 will be 1.009 (mm) in respect of the primary harmonic wave. This moiré pattern is not a problem as it is of the order of 1 (mm), but the secondary moiré pattern generated by this moiré and the pixels is 100 (mm) or above, according to equation (1), and will be very noticeable.

Figure 6:
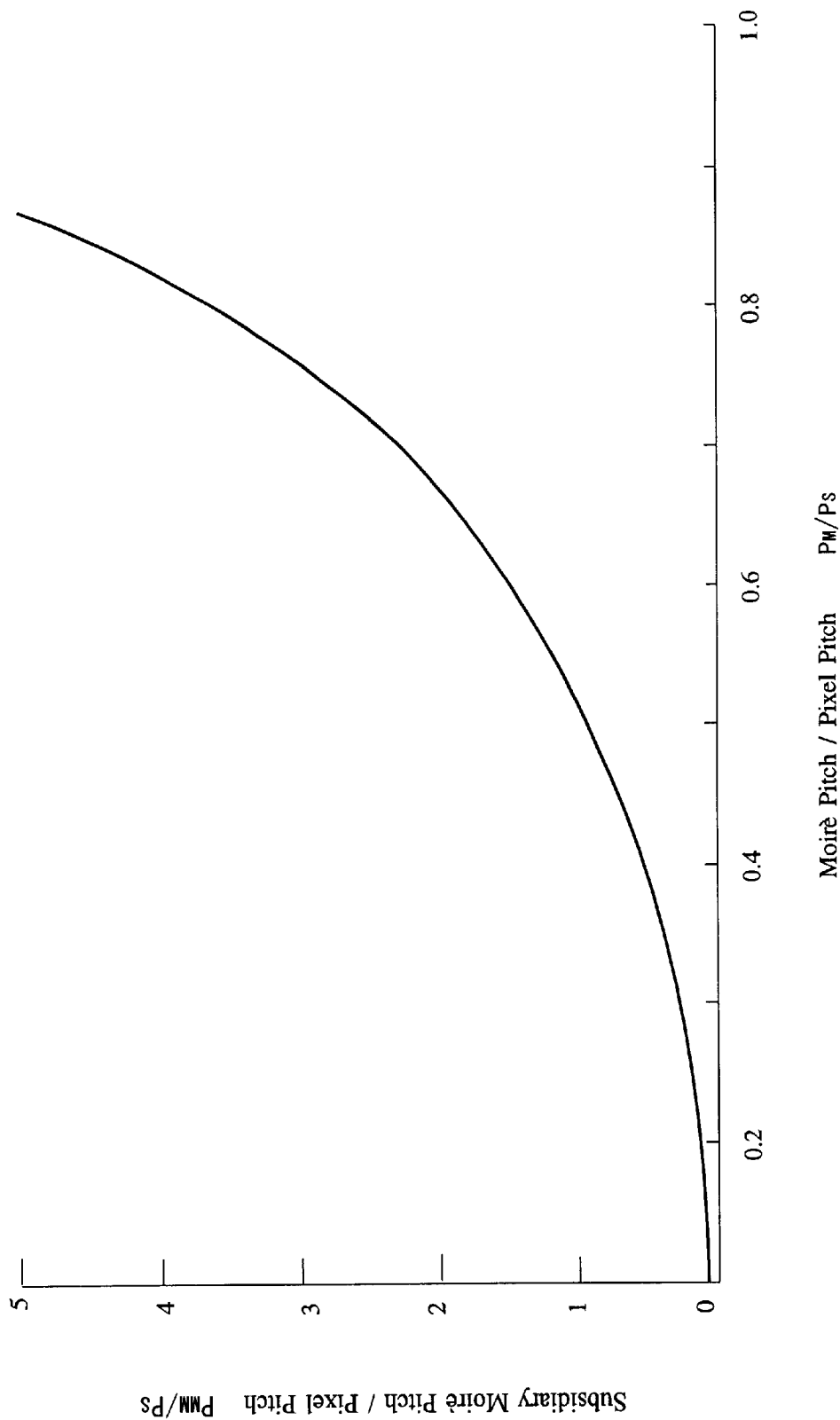
FIG. 6 shows a relationship between a ratio PM/PS between a moiré pitch and a pixel pitch in equation (1) and a ratio PMM/PS between a subsidiary moiré pitch and a pixel pitch.

Here, FIG. 6 shows the relationship between the ratio PM/PS between the moiré pitch and the pixel pitch in equation (1) and the ratio PMM/PS between the subsidiary moiré pitch and the pixel pitch.

In the foregoing example, both i or j are natural numbers of 5 or less, but if the values of these are greater, then a moiré pattern will be generated by the harmonic waves of the lens pitch (or pixel pitch), although this moiré intensity will be very small. In the case of normal screen diffusion characteristics, any moiré intensity generated when i and j are 6 or above can be ignored.

In this way, provided that the combination of the lenticular lens pitch and the Fresnel lens pitch is selected in such a manner that the pitch of the moiré pattern generated between the lenticular lens 22a and the Fresnel lens 22a does not approach the pitch of the pixels, then moiré patterns generated by the three elements can be restricted.

In this way, the lens pitches are set, the respective lens are fabricated on the basis of the established lens pitch values, and the rear projection type screen is manufactured.

Figure 7:
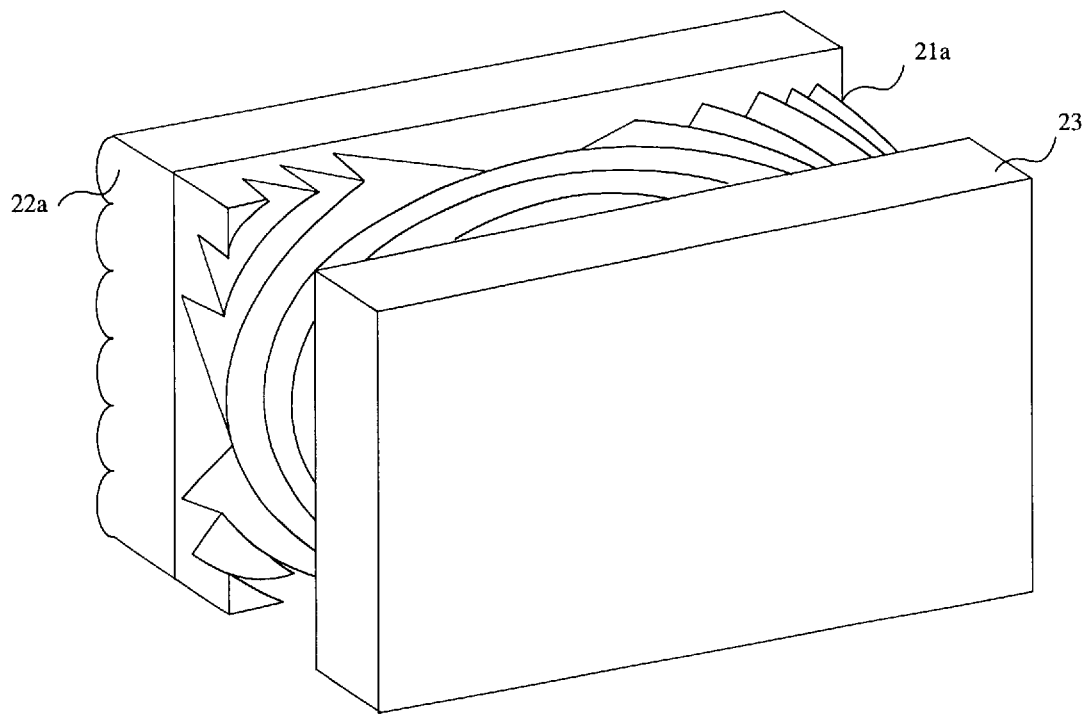
FIG. 7 shows an example of moiré patterns generated by three elements arises in a case where a perpendicular lenticular lens is provided.

A further example of moiré patterns generated by three elements arises in a case where a perpendicular lenticular lens 22a is provided. Such an example is shown in FIG. 7. As shown in FIG. 7, a perpendicular lenticular lens 22a is provided on the incident side of the sheet, and the Fresnel lens 22a is provided on the output side of the sheet. Furthermore, a diffusion plate 23 comprising a flat plate impregnated with a diffusing agent, is provided to the side of the Fresnel lens 22a. In this case also, a three-way moiré pattern generated by the perpendicular lenticular lens, the Fresnel lens, and the pixels, is produced. In this case, the moiré pattern is generated in the perpendicular direction of the screen. The present invention can also be applied in cases such as this, and the combination of the aforementioned three elements should be selected according to equation (1) and equation (2). The pixel pitch in a case where a perpendicular lenticular lens 22a is used will be in the direction in which the light is diffused, in other words, in the longitudinal direction of the screen. The aforementioned examples related to a liquid crystal projector as an example of a projector, but the invention is not limited to this, and may also be applied to any rear projection type screen used in conjunction with a projector having pixels or a composition corresponding to pixels, such as a DMD (Digital Micromirror Device) projector, or the like.

Moreover, in the foregoing example, the rear projection type screen was described as having a two-sheets construction comprising a Fresnel lens sheet 21 and a lenticular lens sheet 22, but the invention is not limited to this. In the case of a one-sheet construction, a Fresnel lens 22a is provided on the incident side and a lenticular lens 22a is provided on the output side. Moreover, even in the case of a two-sheets composition, it is possible to use various combinations for the Fresnel lens 21a and the lenticular lens 22a. For example, it is possible to provide a Fresnel lens 21a on the incident side of one sheet, provide a planar or perpendicular lenticular lens 22a on the output side thereof, and to form a planar incident surface on a second sheet and provide a horizontal lenticular lens 22a on the output surface of this second sheet. Also, it is possible to provide a perpendicular lenticular lens 22a on the incident surface of the first layer, provide a Fresnel lens 21a on the output surface thereof, and to provide a horizontal lenticular lens 22a on the incident surface of this second sheet, forming a planar output surface thereon.

Moreover, the order of calculation is not particularly important when setting the lens pitch of the respective lenses in equation (1) and equation (2) described above.

In the aforementioned example, it is also possible to suppress moiré patterns further if the pitch of the Fresnel lens is equal to or less than 1/3.3 times the pitch of the pixels.

According to the present invention, even if there is a possibility that a three-way moiré pattern will be generated as described above, it is possible to ensure that this moiré pattern does not cause a practical problem. A concrete example is described below.

EXAMPLE 1

In this example, the moiré patterns generated with a lenticular lens pitch of 0.178 (mm), Fresnel lens pitch of 0.100 (mm) and a pixel pitch of 1.11 (mm) were observed. Under these conditions, it was derived from equation (1) that the moiré PM between the lenticular lens 22a and the Fresnel lens 21a was 0.809 (mm). Incidentally, in this case, j=2 and i=1. Furthermore, the moiré PMM generated by the three elements, as derived from equation (1) and 2 was 2.99 (mm). When confirmed on the screen image, there was no problematic moiré pattern in the lateral direction of the screen.

EXAMPLE 2

In this example, the moiré patterns generated with a lenticular lens pitch of 0.178 (mm), Fresnel lens pitch of 0.1124 (mm) and a pixel pitch of 1.11 (mm) were observed. Under these conditions, it was derived from equation (1) that the moiré PM between the lenticular lens 22a and the Fresnel lens 21a was 1.064 (mm). Incidentally, in this case, j=3 and i=2. Furthermore, the moiré PMM generated by the three elements, as derived from equation (1) and 2, was 25 (mm). When confirmed on the screen image, a strong moiré pattern could be seen in the lateral direction of the screen.

According to the present invention, it is possible to provide a rear projection type screen and method for manufacturing same which reduce the occurrence of moiré patterns.

While preferred embodiments of the present invention have been described using specific terms, such description is for illustrative purposes only, and it is to be understood that changes and variations may be made without departing from the spirit or scope of the following claims.

What is claimed is:

1. A rear projection type screen comprising a Fresnel lens and a lenticular lens, for use with a light valve having pixels,
    wherein said rear projection type screen has such lens pitches that the secondary moiré pitch PMM indicated by the following equation is 3 mm or less, taking the lens pitch of said Fresnel lens as PF (mm), the lens pitch of said lenticular lens as PL (mm), and the pitch of the pixels in said light valve as PS (mm):

$$PMM = \frac{1}{\left|\frac{1}{PM} - \frac{1}{PS}\right|} \qquad PM = \frac{1}{\left|\frac{i}{PF} - \frac{j}{PL}\right|}$$

(where i and j are natural numbers).

2. The rear projection type screen according to claim 1, wherein said i and j are natural numbers of 5 or less.

3. The rear projection type screen according to claim 1, being used in conjunction with a liquid-crystal panel.

4. A method of manufacturing a rear projection type screen comprising a Fresnel lens and a lenticular lens, for use with a light valve having pixels, comprising:
    a first step of calculating the moiré pitch of the moiré pattern generated by said Fresnel lens and said lenticular lens, on the basis of the lens pitch of said Fresnel lens and the lens pitch of said lenticular lens;

a second step of calculating a further moiré pitch on the basis of the moiré pitch calculated in the first step and the pitch of the pixels in said light valve;

a third step of setting the respective lens pitches in such a manner that the value of the moiré pitch calculated at said second step is equal to or less than a prescribed value; and a fourth step of manufacturing said Fresnel lens and said lenticular lens on the basis of the lens pitch values set in said third step.

5. A method of manufacturing a rear projection type screen comprising a Fresnel lens and a lenticular lens, for use with a light valve having pixels, wherein respective lens pitches are set in such a manner that the value of the secondary moiré pitch PMM indicated by the following equation is equal to or less than a prescribed value, taking the lens pitch of said Fresnel lens as PF, the lens pitch of said lenticular lens as PL, and the pitch of the pixels in said light valve as PS; and said Fresnel lens and said lenticular lens are manufactured on the basis of the set lens pitch values:

$$PMM = \frac{1}{\left|\frac{1}{PM} - \frac{1}{PS}\right|} \quad PM = \frac{1}{\left|\frac{i}{PF} - \frac{j}{PL}\right|}$$

(where i and j are natural numbers).

6. The method of manufacturing a rear projection type screen according to claim 5, wherein the respective lens pitches are set in such a manner that the value of said secondary moiré pitch PMM is 3 mm or less.

7. The method of manufacturing a rear projection type screen according to claim 5, wherein said i and j are natural numbers of 5 or less.

8. The method of manufacturing a rear projection type screen according to claim 5 wherein the rear projection type screen is used in conjunction with a liquid-crystal panel.

* * * * *